United States Patent
Lee et al.

(10) Patent No.: US 12,258,272 B2
(45) Date of Patent: Mar. 25, 2025

(54) DRY REFORMING OF METHANE USING A NICKEL-BASED BI-METALLIC CATALYST

(71) Applicant: Saudi Arabian Oil Company, Dhahran (SA)

(72) Inventors: Kunho Lee, Dhahran (SA); Sai P. Katikaneni, Dhahran (SA); Aadesh Harale, Dhahran (SA); Bandar Solami, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 728 days.

(21) Appl. No.: 17/401,071

(22) Filed: Aug. 12, 2021

(65) Prior Publication Data

US 2023/0050019 A1    Feb. 16, 2023

(51) Int. Cl.
| | |
|---|---|
| *C01B 3/40* | (2006.01) |
| *B01J 7/00* | (2006.01) |
| *B01J 8/06* | (2006.01) |
| *B01J 23/10* | (2006.01) |
| *B01J 23/46* | (2006.01) |
| *B01J 23/755* | (2006.01) |
| *B01J 23/89* | (2006.01) |
| *B01J 37/18* | (2006.01) |

(52) U.S. Cl.
CPC .................... *C01B 3/40* (2013.01); *B01J 7/00* (2013.01); *B01J 8/06* (2013.01); *B01J 23/10* (2013.01); *B01J 23/462* (2013.01); *B01J 23/755* (2013.01); *B01J 23/894* (2013.01); *B01J 37/18* (2013.01); *B01J 2208/06* (2013.01); *C01B 2203/0238* (2013.01); *C01B 2203/1058* (2013.01); *C01B 2203/1064* (2013.01); *C01B 2203/1082* (2013.01); *C01B 2203/1241* (2013.01)

(58) Field of Classification Search
CPC ......... B01J 23/755; B01J 23/894; C01B 3/40; C01B 2203/0238; C01B 2203/108
See application file for complete search history.

(56) References Cited

U.S. PATENT DOCUMENTS

| | | |
|---|---|---|
| 978,576 A | 12/1910 | Goodell |
| 2,694,678 A | 1/1951 | George et al. |
| 2,614,066 A | 10/1952 | Cornell |
| 2,753,301 A | 7/1956 | Bersworth et al. |
| 2,910,426 A | 10/1959 | Gluesenkamp |
| 3,278,268 A | 10/1966 | Pfefferle, Jr. |
| 3,344,586 A | 10/1967 | Langley et al. |

(Continued)

FOREIGN PATENT DOCUMENTS

| | | |
|---|---|---|
| AU | 2003286894 | 6/2004 |
| AU | 2005286952 | 3/2006 |

(Continued)

OTHER PUBLICATIONS

Machine translation of Mezentseva et al. (WO2016032357), Mar. 3, 2016.*

(Continued)

*Primary Examiner* — Jun Li
(74) *Attorney, Agent, or Firm* — Fish & Richardson P.C.

(57) ABSTRACT

A method of dry reforming methane with $CO_2$ using a bi-metallic nickel and ruthenium-based catalyst. A dry reformer having the bimetallic catalyst as reforming catalyst, and a method of producing syngas with the dry reformer.

17 Claims, 8 Drawing Sheets

(56) References Cited

U.S. PATENT DOCUMENTS

| | | |
|---|---|---|
| 3,409,540 A | 11/1968 | Gould et al. |
| 3,533,938 A | 10/1970 | Leas |
| 3,702,292 A | 11/1972 | Burich |
| 3,726,789 A | 4/1973 | Kovach |
| 3,755,143 A | 8/1973 | Hosoi et al. |
| 3,856,659 A | 12/1974 | Owen |
| 3,979,757 A | 9/1976 | Kilby et al. |
| 4,090,949 A | 5/1978 | Owen et al. |
| 4,134,824 A | 1/1979 | Kamm et al. |
| 4,157,247 A | 6/1979 | Collins, III et al. |
| 4,264,435 A | 4/1981 | Read, Jr. et al. |
| 4,297,203 A | 10/1981 | Ford et al. |
| 4,426,276 A | 1/1984 | Dean et al. |
| 4,466,946 A | 8/1984 | Goddin, Jr. et al. |
| 4,527,003 A | 7/1985 | Okamoto et al. |
| 4,587,011 A | 5/1986 | Okamoto et al. |
| 4,589,896 A | 5/1986 | Chen et al. |
| 4,655,904 A | 4/1987 | Okamoto et al. |
| 4,701,187 A | 10/1987 | Choe |
| 4,717,407 A | 1/1988 | Choe et al. |
| 4,725,349 A | 2/1988 | Okamoto et al. |
| 4,786,400 A | 11/1988 | Farnsworth |
| 4,830,728 A | 5/1989 | Herbst et al. |
| 4,981,676 A | 1/1991 | Minet et al. |
| 4,992,160 A | 2/1991 | Long et al. |
| 5,091,351 A | 2/1992 | Murakawa et al. |
| 5,108,581 A | 4/1992 | Aldridge |
| 5,140,049 A | 8/1992 | Fiato et al. |
| 5,229,102 A | 7/1993 | Minet et al. |
| 5,366,712 A | 11/1994 | Violante |
| 5,401,300 A | 3/1995 | Lokhandwala et al. |
| 5,407,466 A | 4/1995 | Lokhandwala et al. |
| 5,407,467 A | 4/1995 | Lokhandwala et al. |
| 5,632,803 A | 5/1997 | Stoner |
| 5,746,985 A | 5/1998 | Takahashi |
| 5,782,960 A | 7/1998 | Ogawa et al. |
| 5,837,032 A | 11/1998 | Moll et al. |
| 5,904,754 A | 5/1999 | Juda et al. |
| 5,904,837 A | 5/1999 | Fujiyama |
| 5,906,728 A | 5/1999 | Iaccino et al. |
| 5,951,850 A | 9/1999 | Ino et al. |
| 5,997,594 A | 12/1999 | Edlund et al. |
| 6,033,555 A | 3/2000 | Chen et al. |
| 6,119,606 A | 9/2000 | Clark |
| 6,153,163 A | 11/2000 | Prasad |
| 6,179,900 B1 | 1/2001 | Behling et al. |
| 6,180,081 B1 | 1/2001 | Poschmann et al. |
| 6,190,533 B1 | 2/2001 | Bradow et al. |
| 6,210,562 B1 | 3/2001 | Xie et al. |
| 6,214,485 B1 | 4/2001 | Barnett et al. |
| 6,238,465 B1 | 5/2001 | Juda et al. |
| 6,274,032 B2 | 8/2001 | Hood et al. |
| 6,293,979 B1 | 9/2001 | Choudhary et al. |
| 6,296,686 B1 | 10/2001 | Prasad et al. |
| 6,338,833 B1 | 1/2002 | Aasberg-Petersen |
| 6,361,582 B1 | 3/2002 | Pinnau et al. |
| 6,444,712 B1 | 9/2002 | Janda |
| 6,531,515 B2 | 3/2003 | Moore, Jr. et al. |
| 6,656,249 B1 | 12/2003 | Buisnnan |
| 6,656,346 B2 | 12/2003 | Ino et al. |
| 6,743,961 B2 | 6/2004 | Powers |
| 6,787,576 B2 | 9/2004 | Kiss et al. |
| 6,830,596 B1 | 12/2004 | Deckman et al. |
| 6,896,717 B2 | 5/2005 | Pinnau et al. |
| 6,960,235 B2 | 11/2005 | Morse et al. |
| 6,979,757 B2 | 12/2005 | Powers |
| 7,019,187 B2 | 3/2006 | Powers |
| 7,022,165 B2 | 4/2006 | Paglieri et al. |
| 7,025,941 B1 | 4/2006 | Autenrieth et al. |
| 7,045,554 B2 | 5/2006 | Raje |
| 7,112,271 B2 | 9/2006 | Jo et al. |
| 7,132,042 B2 | 11/2006 | Genetti et al. |
| 7,182,917 B2 | 2/2007 | Krueger |
| 7,217,304 B2 | 5/2007 | Deckman et al. |
| 7,323,148 B2 | 1/2008 | Shah et al. |
| 7,353,982 B2 | 4/2008 | Li |
| 7,374,664 B2 | 5/2008 | Powers |
| 7,390,536 B2 | 6/2008 | Ma et al. |
| 7,396,449 B2 | 7/2008 | Powers |
| 7,404,889 B1 | 7/2008 | Powers |
| 7,419,584 B2 | 9/2008 | Stell et al. |
| 7,527,661 B2 | 5/2009 | Chellappa et al. |
| 7,550,642 B2 | 6/2009 | Powers |
| 7,642,292 B2 | 1/2010 | Severinsky |
| 7,700,005 B2 | 4/2010 | Inui et al. |
| 7,744,747 B2 | 6/2010 | Halsey |
| 7,772,450 B2 | 8/2010 | Iaccino et al. |
| 7,794,690 B2 | 9/2010 | Abatzoglou et al. |
| 7,858,834 B2 | 12/2010 | Powers |
| 7,871,457 B2 | 1/2011 | Shah et al. |
| 7,906,559 B2 | 3/2011 | Olah et al. |
| 7,959,897 B2 | 6/2011 | Cui et al. |
| 7,972,498 B2 | 7/2011 | Buchanan et al. |
| 7,973,087 B2 | 7/2011 | Kibby et al. |
| 8,043,588 B2 | 10/2011 | Hustad et al. |
| 8,119,205 B2 | 2/2012 | Roa et al. |
| 8,163,064 B2 | 4/2012 | Bredesen et al. |
| 8,198,338 B2 | 6/2012 | Shulenberger et al. |
| 8,440,729 B2 | 5/2013 | Olah et al. |
| 8,500,859 B2 | 8/2013 | Eisenbeger |
| 8,518,151 B2 | 8/2013 | Tessier et al. |
| 8,563,185 B2 | 10/2013 | Assink et al. |
| 8,585,802 B2 | 11/2013 | Keller |
| 8,597,383 B2 | 12/2013 | Pham et al. |
| 8,721,773 B2 | 5/2014 | Perkins, II et al. |
| 8,722,003 B1 | 5/2014 | Avagliano et al. |
| 8,726,983 B2 | 5/2014 | Khan |
| 8,747,766 B2 | 6/2014 | Noda |
| 8,778,058 B2 | 7/2014 | Way et al. |
| 8,828,121 B1 | 9/2014 | He et al. |
| 8,835,517 B2 | 9/2014 | Cheiky et al. |
| 8,900,546 B2 | 12/2014 | Van De Graaf et al. |
| 8,931,347 B2 | 1/2015 | Donzier et al. |
| 9,044,715 B2 | 6/2015 | Way et al. |
| 9,067,850 B2 | 6/2015 | Abbott et al. |
| 9,079,770 B2 | 7/2015 | Ahmed et al. |
| 9,085,497 B2 | 7/2015 | Jennings |
| 9,090,543 B2 | 7/2015 | Schoedel et al. |
| 9,096,806 B2 | 8/2015 | Abba et al. |
| 9,102,532 B2 | 8/2015 | Iaquaniello et al. |
| 9,126,876 B2 | 9/2015 | de Jong et al. |
| 9,138,718 B2 | 9/2015 | Li et al. |
| 9,181,148 B2 | 11/2015 | Katikaneni et al. |
| 9,228,140 B2 | 1/2016 | Abba et al. |
| 9,242,230 B2 | 1/2016 | Moon et al. |
| 9,249,064 B2 | 2/2016 | Kumar et al. |
| 9,255,230 B2 | 2/2016 | Shafi et al. |
| 9,279,088 B2 | 3/2016 | Shafi et al. |
| 9,284,497 B2 | 3/2016 | Bourane et al. |
| 9,284,502 B2 | 3/2016 | Bourane et al. |
| 9,296,961 B2 | 3/2016 | Shafi et al. |
| 9,328,035 B1 | 5/2016 | Kuhn et al. |
| 9,481,938 B2 | 11/2016 | Shin et al. |
| 9,493,350 B2 | 11/2016 | Morico et al. |
| 9,499,403 B2 | 11/2016 | Al-Muhaish et al. |
| 9,624,913 B2 | 4/2017 | Friesth |
| 9,637,432 B2 | 5/2017 | Chakravarti et al. |
| 9,643,906 B2 | 5/2017 | Zubrin et al. |
| 9,676,678 B1 | 6/2017 | Agee et al. |
| 9,752,080 B2 | 9/2017 | Christensen et al. |
| 9,863,244 B2 | 1/2018 | Donzier et al. |
| 9,952,192 B2 | 4/2018 | Donzier et al. |
| 10,008,730 B2 | 6/2018 | Jamal et al. |
| 10,131,599 B2 | 11/2018 | Olah et al. |
| 10,131,602 B1 | 11/2018 | Gondal et al. |
| 10,160,708 B2 | 12/2018 | Lee et al. |
| 10,161,051 B2 | 12/2018 | Palmore et al. |
| 10,173,145 B2 | 1/2019 | Nishibe et al. |
| 10,283,795 B2 | 5/2019 | Jamal et al. |
| 10,329,677 B2 | 6/2019 | Geioushy et al. |
| 10,357,759 B2 | 7/2019 | D'Souza et al. |
| 10,472,951 B2 | 11/2019 | Donzier et al. |
| 10,478,806 B2 | 11/2019 | Schuetzle et al. |
| 10,527,751 B2 | 1/2020 | Donzier et al. |

(56) References Cited

U.S. PATENT DOCUMENTS

| | | | |
|---|---|---|---|
| 10,532,961 B2 | 1/2020 | Pan et al. |
| 10,800,716 B2 | 10/2020 | Bhadrashankar et al. |
| 10,953,388 B1 | 3/2021 | Harale et al. |
| 2003/0041519 A1 | 3/2003 | Maruko |
| 2003/0129109 A1 | 7/2003 | Bronicki |
| 2003/0172589 A1 | 9/2003 | Krueger |
| 2003/0175565 A1 | 9/2003 | Noda |
| 2004/0094453 A1 | 5/2004 | Lok et al. |
| 2004/0120889 A1 | 6/2004 | Shah et al. |
| 2005/0045034 A1 | 3/2005 | Paglieri et al. |
| 2005/0109037 A1 | 5/2005 | Deckman et al. |
| 2005/0109821 A1 | 5/2005 | Li |
| 2005/0211603 A1 | 9/2005 | Guillaume et al. |
| 2005/0217479 A1 | 10/2005 | Hale et al. |
| 2006/0013759 A1 | 1/2006 | Jiang et al. |
| 2006/0057060 A1 | 3/2006 | Sun et al. |
| 2006/0124445 A1 | 6/2006 | Labrecque et al. |
| 2007/0157517 A1 | 6/2007 | Tsay et al. |
| 2007/0180991 A1 | 8/2007 | Chellappa et al. |
| 2007/0277870 A1 | 12/2007 | Wechsler |
| 2008/0001645 A1 | 1/2008 | Kuroki |
| 2008/0011644 A1 | 1/2008 | Dean et al. |
| 2008/0011645 A1 | 1/2008 | Dean |
| 2008/0033218 A1 | 2/2008 | Lattner et al. |
| 2008/0067077 A1 | 3/2008 | Kodera et al. |
| 2008/0083648 A1 | 4/2008 | Bishop et al. |
| 2008/0194900 A1 | 8/2008 | Bhirud |
| 2008/0277314 A1 | 11/2008 | Halsey |
| 2008/0283445 A1 | 11/2008 | Powers |
| 2009/0050523 A1 | 2/2009 | Halsey |
| 2009/0221723 A1 | 9/2009 | Leviness |
| 2010/0089795 A1 | 4/2010 | Fujiyama et al. |
| 2010/0137458 A1 | 6/2010 | Erling |
| 2010/0193370 A1 | 8/2010 | Olah et al. |
| 2010/0260657 A1 | 10/2010 | Niitsuma et al. |
| 2010/0264014 A1 | 10/2010 | Mignon et al. |
| 2011/0076225 A1 | 3/2011 | Shah et al. |
| 2011/0083996 A1 | 4/2011 | Shafi et al. |
| 2011/0089378 A1 | 4/2011 | Sato et al. |
| 2011/0114502 A1 | 5/2011 | Cole et al. |
| 2011/0138854 A1 | 6/2011 | Huang et al. |
| 2011/0177410 A1 | 7/2011 | Assink et al. |
| 2011/0247500 A1 | 10/2011 | Akhras et al. |
| 2012/0111051 A1 | 5/2012 | Kulkarni et al. |
| 2012/0128999 A1 | 5/2012 | Way et al. |
| 2012/0168154 A1 | 7/2012 | Chinn et al. |
| 2012/0195824 A1 | 8/2012 | Van De Graaf et al. |
| 2012/0258037 A1 | 10/2012 | Pham et al. |
| 2012/0323059 A1 | 12/2012 | Liu et al. |
| 2013/0129610 A1 | 5/2013 | Kale |
| 2013/0172432 A1 | 7/2013 | Fleys et al. |
| 2013/0202517 A1 | 8/2013 | Ayala et al. |
| 2013/0220884 A1 | 8/2013 | Bourane et al. |
| 2013/0233766 A1 | 9/2013 | Shafi et al. |
| 2013/0248419 A1 | 9/2013 | Abba |
| 2013/0256124 A1 | 10/2013 | Rahman et al. |
| 2014/0170061 A1 | 6/2014 | Chaubey et al. |
| 2014/0246399 A1 | 9/2014 | Chiba |
| 2014/0299816 A1* | 10/2014 | Son .................. B01J 35/393 |
| | | 502/328 |
| 2014/0338395 A1 | 11/2014 | Oelfke et al. |
| 2014/0363345 A1 | 12/2014 | Li et al. |
| 2015/0037246 A1 | 2/2015 | Morico et al. |
| 2015/0047986 A1 | 2/2015 | Shin et al. |
| 2015/0231561 A1 | 8/2015 | Reardon et al. |
| 2015/0240717 A1 | 8/2015 | Starcher et al. |
| 2015/0290575 A1 | 10/2015 | Rothermel et al. |
| 2015/0298972 A1 | 10/2015 | Ballaguet et al. |
| 2016/0121258 A1 | 5/2016 | First |
| 2016/0214859 A1 | 6/2016 | Beltramini et al. |
| 2016/0228813 A1 | 8/2016 | Schwartz |
| 2016/0264886 A1 | 9/2016 | Davydov |
| 2016/0340187 A1 | 11/2016 | Said et al. |
| 2017/0045290 A1 | 2/2017 | Ploeger et al. |
| 2017/0050845 A1 | 2/2017 | Lofberg et al. |
| 2017/0312682 A1 | 11/2017 | Keller |
| 2017/0320736 A1 | 11/2017 | Voss et al. |
| 2018/0066197 A1 | 3/2018 | Koseoglu et al. |
| 2018/0079643 A1 | 3/2018 | Mortensen et al. |
| 2018/0094195 A1 | 4/2018 | Lehoux et al. |
| 2018/0119026 A1 | 5/2018 | Kinzl et al. |
| 2018/0148655 A1 | 5/2018 | Low et al. |
| 2018/0187106 A1 | 7/2018 | Abudawoud et al. |
| 2018/0187107 A1 | 7/2018 | Abudawoud et al. |
| 2018/0312767 A1 | 11/2018 | Al-Sayed et al. |
| 2018/0370796 A1 | 12/2018 | Mokheimer et al. |
| 2019/0003303 A1 | 1/2019 | Donzier et al. |
| 2019/0067706 A1 | 2/2019 | Liu et al. |
| 2019/0112535 A1 | 4/2019 | Kinzl et al. |
| 2019/0135624 A1 | 5/2019 | Mair |
| 2019/0168206 A1 | 6/2019 | Yavuz et al. |
| 2019/0359894 A1 | 11/2019 | Heidel et al. |
| 2019/0376821 A1 | 12/2019 | Donzier et al. |
| 2020/0023304 A1 | 1/2020 | Balzer et al. |
| 2021/0031139 A1 | 2/2021 | Hamad et al. |
| 2021/0163832 A1 | 6/2021 | Harale |
| 2021/0163833 A1 | 6/2021 | Harale |
| 2021/0164393 A1 | 6/2021 | Younes |
| 2021/0188633 A1 | 6/2021 | Alsolami et al. |
| 2022/0009774 A1* | 1/2022 | Harale ...................... C01B 3/40 |

FOREIGN PATENT DOCUMENTS

| | | | |
|---|---|---|---|
| AU | 2005287034 | 3/2006 | |
| AU | 2010291148 | 3/2011 | |
| AU | 2012243063 | 10/2012 | |
| CA | 2458314 | 4/1999 | |
| CA | 2580580 | 3/2006 | |
| CA | 2580585 | 3/2006 | |
| CA | 2414657 | 5/2011 | |
| CA | 2547011 | 8/2011 | |
| CA | 2938299 | 5/2015 | |
| CA | 2968601 | 6/2016 | |
| CN | 101522595 | 9/2009 | |
| CN | 203415657 | 1/2014 | |
| CN | 104001408 | 8/2014 | |
| CN | 104098071 | 10/2014 | |
| CN | 104258864 | 1/2015 | |
| CN | 103586030 B | 12/2015 | |
| CN | 102482079 | 5/2016 | |
| CN | 105561998 | 5/2016 | |
| CN | 103596671 | 6/2016 | |
| CN | 103586030 | 11/2016 | |
| CN | 105197887 | 3/2017 | |
| CN | 105776133 | 11/2017 | |
| CN | 110600775 | 12/2019 | |
| EP | 0130933 | 9/1987 | |
| EP | 0684066 | 11/1995 | |
| EP | 0892862 | 1/1999 | |
| EP | 1024111 | 8/2000 | |
| EP | 1130080 | 9/2001 | |
| EP | 1294637 | 3/2003 | |
| EP | 1683216 | 7/2006 | |
| EP | 1789171 | 5/2007 | |
| EP | 1789172 | 5/2007 | |
| EP | 1828085 | 9/2007 | |
| EP | 1829821 | 9/2007 | |
| EP | 2035329 | 3/2009 | |
| EP | 0909804 | 9/2010 | |
| EP | 2696966 | 2/2014 | |
| EP | 2825503 | 1/2015 | |
| EP | 2999537 | 3/2016 | |
| EP | 2473441 | 8/2018 | |
| EP | 4289506 A2 * | 12/2023 | .............. B01J 23/04 |
| FR | 2943657 | 3/2009 | |
| GB | 2461032 | 12/2009 | |
| JP | H 09278403 | 10/1997 | |
| JP | 2943657 | 8/1999 | |
| JP | 2001348205 | 12/2001 | |
| JP | 3326753 | 9/2002 | |
| JP | 2004502623 | 1/2004 | |
| JP | 2004249264 | 9/2004 | |
| JP | 2004352528 | 12/2004 | |
| JP | 2005044601 | 2/2005 | |

(56) References Cited

FOREIGN PATENT DOCUMENTS

| | | |
|---|---|---|
| JP | 2007190455 | 8/2007 |
| JP | 2008513337 | 5/2008 |
| JP | 2008513338 | 5/2008 |
| JP | 4381033 | 10/2009 |
| JP | 2010266155 | 11/2010 |
| JP | 2011195352 | 10/2011 |
| JP | 2011195387 | 10/2011 |
| JP | 2011206612 | 10/2011 |
| JP | 2013503807 | 2/2013 |
| JP | 5390448 | 10/2013 |
| JP | 5588581 | 8/2014 |
| JP | 2014519463 | 8/2014 |
| JP | 5611627 | 9/2014 |
| JP | 2014169222 | 9/2014 |
| JP | 6040701 | 12/2016 |
| JP | 6345406 | 6/2018 |
| KR | 101531291 | 7/2015 |
| KR | 101828938 | 2/2018 |
| NO | 200701530 | 4/2007 |
| NO | 200701532 | 6/2007 |
| TW | 200619136 | 6/2006 |
| TW | 200630158 | 9/2006 |
| TW | I579034 | 4/2017 |
| WO | WO 2000009633 | 2/2000 |
| WO | WO 2000016901 | 3/2000 |
| WO | WO 2001064577 | 9/2001 |
| WO | WO 2002002460 | 1/2002 |
| WO | WO 2002038703 | 5/2002 |
| WO | WO 2002069430 | 9/2002 |
| WO | WO 2002070402 | 9/2002 |
| WO | WO 2004041714 | 5/2004 |
| WO | WO 2005051590 | 6/2005 |
| WO | WO 2006034086 | 3/2006 |
| WO | WO 2006034100 | 3/2006 |
| WO | WO 2006034103 | 3/2006 |
| WO | WO 2006037584 | 4/2006 |
| WO | WO 2006082933 | 8/2006 |
| WO | WO 2006097703 | 9/2006 |
| WO | WO 2007031713 | 3/2007 |
| WO | WO 2008000782 | 1/2008 |
| WO | WO 2009073436 | 6/2009 |
| WO | WO 2010009077 | 1/2010 |
| WO | WO 2010009082 | 1/2010 |
| WO | WO 2010009089 | 1/2010 |
| WO | WO 2010017372 | 2/2010 |
| WO | WO 2010107942 | 9/2010 |
| WO | WO 2010109106 | 9/2010 |
| WO | WO 2010143783 | 12/2010 |
| WO | WO 2011026943 | 3/2011 |
| WO | WO 2011063353 | 5/2011 |
| WO | WO 2012006429 | 1/2012 |
| WO | WO 2012142009 | 10/2012 |
| WO | WO 2012143096 | 10/2012 |
| WO | WO 2012158673 | 11/2012 |
| WO | WO 2013137720 | 9/2013 |
| WO | WO 2015128045 | 9/2013 |
| WO | WO 2014170184 | 10/2014 |
| WO | WO 2015128018 | 9/2015 |
| WO | WO 2015183200 | 12/2015 |
| WO | WO-2016032357 A1 * 3/2016 ............ B01J 23/755 | |
| WO | WO 2016069385 | 5/2016 |
| WO | WO 2016193736 | 12/2016 |
| WO | WO 2016207892 | 12/2016 |
| WO | WO 2017001891 | 1/2017 |
| WO | WO 2017020919 | 2/2017 |
| WO | WO 2017085594 | 5/2017 |
| WO | WO 2018142343 | 8/2018 |
| WO | WO 2018142351 | 8/2018 |
| WO | WO 2018226617 | 12/2018 |
| WO | WO 2020118420 | 6/2020 |
| ZA | 201201141 | 10/2012 |

OTHER PUBLICATIONS

U.S. Appl. No. 17/118,075, Al-Rowaili et al., filed Dec. 10, 2020.
U.S. Appl. No. 17/118,115, Al-Rowaili et al., filed Dec. 10, 2020.
U.S. Appl. No. 17/140,258, Younes et al., filed Jan. 4, 2021.
U.S. Appl. No. 17/140,274, Younes et al., filed Jan. 4, 2021.
U.S. Appl. No. 61/562,189, Lee et al., filed Nov. 21, 2011.
IEA, "Putting CO2 to Use: Creating value from emissions," Sep. 2019, 86 pages.
Abbassi et al., "Efficiency improvements in production profiling using ultracompact flow array sensing technology," Petrophysics, Aug. 2018, 59(4): 457-488, 32 pages.
Amo et al., "Low-Quality Natural Gas Sulfur Removal/Recovery," Membrane Technology and Research, DOE Report DE-AC21-92MC28133-01, Jan. 29, 1998, 107 pages.
An et al., "Morphology control of Co2C nanostructures via the reduction process for direct production of lower olefins from syngas," Journal of Catalysis, Oct. 2018, 366:289-99, 11 pages.
Arora and Prasad, "An overview on dry reforming of methane: strategies to reduce carbonaceous deactivation of catalysts," RSC Adv., 2016, 6:108668, 21 pages.
Aschoundong et al., "Silane Modification of Cellulose Acetate Dense Films as Materials for Acid Gas Removal Macromolecules," Macromolecules, Jul. 9, 2013, 46(14), 11 pages.
Belov et al., "Gas transport and free volume in hexafluoropropylene polymers," Journal of Membrane Science, Nov. 2011, 383, 8 pages.
Bernardo et al., "Gas transport properties of Pebax/room temperature ionic liquid gel membranes," Separation and Purification Technology, Sep. 2012, 97, 13 pages.
Bhide et al., "Hybrid processes for the removal of acid gases from natural gas," Journal of Membrane Science, Mar. 4, 1998, 140(1), 2 pages, Abstract Only.
Chatterjee et al., "Poly(ether urethane) and poly(ether urethane urea) membranes with high $H_2S/CH_4$ selectivity," Journal of Membrane Science, Nov. 1997, 135(99), 8 pages.
Chu et al., "Negatively Thermoresponsive Membranes with Functional Gates Driven by Zipper-Type Hydrogen-Bonding Interactions," Angew. Chem. Int. Ed., 2005, 44:2124-2127, 4 pages.
Cimino, "Deploying a solar hybrid technology in a remote oil and gas production site," Journal of the Japan Institute of Energy, Jan. 2015, 94:1163-1168, 7 pages.
Coulter et al., "Sulfur tolerant PdAu and PdAuPt allow hydrogen separation membranes," Journal of Membrane Science, 2012, 405-406:11-19.
Desouza et al., "Portable Emission Measurement System (PEMS) Testing of a 100KVA Generator using Red Diesel and ISO grade Diesel," King's College London, Environmental Research Group, Dec. 2016, 12 pages.
Er-rbib et al., "Dry reforming of methane—review of feasibility studies," Chemical Engineering Transactions, 2012, 29:163-168, 7 pages.
Fakeeha et al., "Effect of changing CH4/CO2 ratio on hydrogen production by dry reforming reaction," 16th WHEC, Jun. 13-16, 2006, 1:245-256, 12 pages.
Fasihi et al., "Techno-economic assessment of CO2 direct air capture plants," Journal of Cleaner Production, Jul. 2019, 224:957-980, 24 pages.
FuelCell Energy "Air Products and FuelCell Energy Begin Construction of High Efficiency Hydrogen Energy Station Demonstration for Combined Hydrogen, Electricity and Heat Generation," System Designed to Address Industrial and Transportation Applications, Mar. 2007, 5 pages.
Goeppert et al., "Air as the renewable carbon source of the future: an overview of CO2 capture from the atmosphere," Energy & Environmental Science, 2012, 5:7833-7853, 21 pages.
Homerenergy.com[online], "Homer Pro 3.14" Jun. 19, 2020, [retrieved on Dec. 28, 2020], retrieved from : URL <https://www.homerenergy.com/products/pro/docs/latest/how_homer_creates_the_generator_efficiency_curve.html>, 1 page.

(56) References Cited

OTHER PUBLICATIONS

Ibrahim et al., "Dry reforming of methane using Ce-modified Ni supported on 8% PO4 +ZrO2 catalysts," Catalysts, 2020, 10:242, 16 pages.
Jafarbegloo et al., "One-pot synthesis of NiO—MgO nanocatalysts for CO2 reforming of methane: The influence of active metal content on catalytic performance," Journal of Natural Gas Science and Engineering 2015, 27(2): 1165-1173, 23 pages.
Jansen et al., "On the unusual solvent and the effect on the gas transport in perfluorinated Hyflon AD Membranes," Journal of Membrane Science, Jan. 2007, 287(1), 6 pages.
Kang et al., "Effect of copper surface morphology on grain size uniformity of graphene grown by chemical vapor deposition," Current Applied Physics 2019, 19.12:1414-1420, 7 pages.
Keith et al., "A Process for Capturing CO 2 from the Atmosphere," Joule, Aug. 2018, 23 pages.
Kim et al., "Methanol synthesis from syngas over supported palladium catalysts prepared using water-in-oil microemulsion," Applied Catalysis A: General, 1998, 169:157-64, 8 pages.
Klette et al., "Sputtering of very thin palladium-alloy hydrogen separation membranes," Membrane Technology, May 2005, 3 pages.
Knipe et al., "CO2 Absorption and Regeneration Cycling with Micro-Encapsulated CO2 Sorbents," Environmental Science & Technology, Feb. 2018, 24 pages.
Kraftschik et al., "Dense film polyimide membranes for aggressive sour gas feed separations," Journal of Membrane Science, Feb. 1, 2013, 428, 12 pages.
Lallemand et al., "Extending the treatment of highly sour gases: cryogenic distillation," Digital Refining: Processing, Operations & Maintenance, Jan. 2014, 8 pages.
Lallemand et al., "Highly sour gas processing: Bulk removal with SPREX Process," IPTC-10581-MS, International Petroleum Technology Conference, Nov. 2005, 18 pages.
Lallemand et al., "Solutions for the treatment of highly sour gases," Digital Refinding: Processing, Operations & Maintenance, Apr. 2012, 14 pages.
Lavoie, "Review on dry reforming of methane, a potentially more environmentally friendly approach to increasing natural gas exploitation," Frontier in Chemistry, Nov. 2014, 2:81, 17 pages.
Leo, "Tri-Generation Fuel Cells: Opening Doors to Distributed Hydrogen Markets," CryoGas International, Jul. 2016, 3 pages.
Lockhart, "Sour oil and gas management: 3.3," vol. Lii/New Developments: Energy, Transport, Sustainability Encyclopedia of Hydrocarbons, 2007, 34 pages.
Lokhandwala et al., "Membrane separation of nitrogen from natural gas: A case study from membrane synthesis to commercial deployment," Journal of Membrane Science, Jan. 2010, 346, 10 pages.
Malico et al., "Design of a trigeneration system using a high-temperature fuel cell," International journal of energy research, Special Issue: The changing energy paradigm, challenges and new developments, Feb. 2009, 33:2 (144-151), 8 pages.
Manliclic et al., "Tri-Generation Fuel Cell Technologies for Location-Specific Applications," AN047, Advanced Power and Energy Program, Jun. 17, 2014, 19 pages.
Merkel and Toy, "Comparison of Hydrogen Sulfide Transport Properties in Fluorinated and Nonfluorinated Polymers," Macromolecules, Sep. 2006, 39(22), 10 pages.
Milanov et al., "Dry Reforming of Methane with CO2 at Elevated Pressures," New Technologies and Alternative Feedstocks in Petrochemistry and Refining DGMK Conference Oct. 9-11, 2013, 5 pages.
Mogensen et al., "Methane Steam Reforming over an Ni-YSZ Solid Oxide Fuel Cell Anode in Stack Configuration," Journal of Chemistry, 2014, Article ID 710391, 9 pages.
Mori et al., "Reactor configuration and concentration polarization in methane steam reforming by a membrane reactor with a highly hydrogen-permeable membrane," Industrial & Engineering Chemistry Research, Feb. 2007, 46(7):1952-1958, 7 pages.
Oi et al., "Simulation and cost comparison of CO2 liquefaction," Energy Procedia, 2016, 86:500-510, 11 pages.

Olah et al., "Single step Bi-reforming and oxidative Bi-reforming of methane (Natural gas) with Steam and Carbon dioxide to Metgas for methanol synthesis," ACS publications, 2015, 18 pages.
Park et al., "Reversible Self-Actuated Thermo-Responsive Pore Membrane," Scientific Report, Dec. 2016, 10 pages.
Perez-Fortes et. al., "Design of a Pilot SOFC System for the Combined Production of Hydrogen and Electricity under Refueling Station Requirements," Fuel Cells, 2019, 19:4 (389-407), 19 pages.
Pitchaimani et al., "Manufacturable plastic microfluidic valves using thermal actuation," Lab on a Chip, Aug. 2009, 9:21 (3082-3087), 6 pages.
Qin et al., "Roughness of copper substrate on three-dimensional tin electrode for electrochemical reduction of CO2 into HCOOH," Journal of $CO_2$ Utilization, 2017, 21:219-223, 5 pages.
Robeson, "The upper bound revisited," Journal of Membrane Science, 320, Jul. 15, 2008, 11 pages.
Rufford et al., "The removal of CO2 and N2 from natural gas: A review of conventional and emerging process technologies," Journal of Petroleum Science and Engineering, Sep. 2012, 94-95, 32 pages.
Schakel et al., Assessing the techno-environmental performance of CO2 utilization via dry reforming of methane for the production of dimethyl ether,: Journal of CO2 utilization, Dec. 2016,16:138-149, 12 pages.
Schulz et al., "Dry Reforming of Methane at Elevated Pressures," New Technologies and Alternative Feedstocks in Petrochemistry and Refining DGMK Conference Oct. 9-11, 2013, Dresden, Germany, DGMK-Tagungsbericht 2013-2, 1 page.
Shi et al., "An Introduction of CO2 Conversion by Dry Reforming with Methane and New Route of Low-Temperature Methanol Synthesis," Accounts of Chemical Research. 2013, 46:1838-47, 10 pages.
Shojaeddini, "Oil and gas company strategies regarding the energy transition," Progress in Energy, 01:2001, 2019, 20 pages.
Su et al., "Syngas to light olefins conversion with high olefin/paraffin ratio using ZnCrOx/AIPO-18 bifunctional catalysts," Nature Communications, Mar. 2019, 10:1, 8 pages.
Tosti et al., "Diffusion Bonding of Pd—Ag Rolled Membranes", Journal of Materials Science, 2004, 39:3041-3046.
Uemoto et al., "Electrochemical Carbon Dioxide Reduction in Methanol at Cu and Cu20-Deposited Carbon Black Electrodes," ChemEngineering 3.1:15, 2019, 10 pages.
Vericella et al., "Encapsulated liquid sorbents for carbon dioxide capture," Nature Communications, Feb. 2015, 7 pages.
Wang et al., "CO2 capture by solid adsorbents and their application: current status and new trends," Energy & Environmental Science, 2011, 4:42-55, 14 pages.
Wang et al., "One-step synthesis of dimethyl ether from syngas on ordered mesoporous copper incorporated alumina," Journal of Energy Chemistry, Sep. 2016, 5:775-81, 7 pages.
Weiss et al., "Coking of Oil Sands, Asphaltenes and Residual Oils in the LR-Process," Unitar Conference, Aug. 9, 1988, 23 pages.
Wismann et al., "Electrified methane reforming: A compact approach to greener industrial hydrogen production," Science Magazine, May 2019, 364(6442): 756-759.
Wolfbeisser et al., "Methane dry reforming over ceria-zirconia supported Ni catalysts," Catalysis Today, Nov. 2016, 277:2 (234-245), 12 pages.
Xu et al., "An Improved CO2 Separation and Purification System Based on Cryogenic Separation and Distillation Theory," Energies ISSN 1996-1073, May 2014, 7: 3484-3502.
Yu et al., "Combined Hydrogen, Heat and Power (CHHP) pilot plant design," International Journal of Hydrogen Energy, Apr. 22, 2013, 38:12 (4881-4888), 8 pages.
Zhang et al., "Coke-resistant Ni@SiO2 catalyst for dry reforming of methane," Applied Catalysis B: Environmental, Oct. 2015, 176-177: 513-521, 9 pages.
Ayoub et al., "Effects of operating parameters for dry reforming of methane: A short review," In E3S Web of Conferences, 2021, 287:04015, 8 pages.
Ramirez-Cabrera et al., "Catalytic steam reforming of methane over CCe0.9Gd0.102-x," Applied Catalysis B: Environmental, 2004, 47(2):127-131, 5 pages.

(56) References Cited

OTHER PUBLICATIONS

Ugwu et al., "An advancement in $CO_2$ realization through novel gas switching dry reforming," International Journal of Greenhouse Gas Control, 2019, 90, 13 pages.

SAIP Examination Report in Saudi Arabian Appln. No. 122440058, dated Oct. 5, 2023, 21 pages, with English Translation.

* cited by examiner

300

DRY REFORMING OF METHANE USING A NICKEL-BASED BI-METALLIC CATALYST

TECHNICAL FIELD

This disclosure relates to a process of dry reforming methane using a nickel-based bi-metallic catalyst.

BACKGROUND

Carbon dioxide ($CO_2$) is the primary greenhouse gas emitted through human activities, and reducing $CO_2$ emissions is a major challenge. Carbon dioxide may be generated in various industrial and chemical plant facilities, and ways to convert carbon dioxide into useful substances is actively researched. Dry reforming of methane is a process that produces an industrially useful synthetic gas called syngas (a mixture of hydrogen and carbon monoxide) by reacting carbon dioxide with methane at high temperatures in the presence of a catalyst ($CH_4 + CO_2 \leftrightarrows 2H_2 + 2\ CO$, $\Delta H°_{298} = 247.3$ kJ/mol). The syngas produced by dry reforming can be used directly in the synthesis of various chemical substances or hydrocarbons, and thus is a valuable product. However, there are several obstacles hindering practical commercialization of this process, including the instability and low activity of catalysts typically used in the dry reforming process.

Because dry reforming of methane gives higher conversion rates as temperature increases, in order to obtain a high-purity product, the reaction is typically carried out at temperatures of about 600° C. or higher in the presence of a catalyst. However, when typical catalysts are exposed to such high temperatures for an extended period of time, the active metal of the catalyst is sintered, thereby reducing its active surface.

Another problem encountered in dry reforming is the solid-carbon formation in the dry-reformer reactor vessel, where the surface of the active metal of the catalyst is covered with carbon as a side reaction product. The solid carbon or carbonaceous material is called coke, and the solid-carbon formation is sometimes called coke formation. Deposition of the solid carbon on the reforming catalyst can reduce catalyst effectiveness and consequently lower conversion of the feed into syngas. Accordingly, the activity of catalysts used in the dry reforming process generally tends to decrease over time.

SUMMARY

An aspect relates to a method of dry reforming methane, including reacting the methane with carbon dioxide via a reforming catalyst to generate synthesis gas including hydrogen and carbon monoxide, wherein the reforming catalyst includes a nickel component, a ruthenium component, a cerium oxide component, and a gadolinium oxide component.

Another aspect relates to a method of dry reforming methane, including providing methane and carbon dioxide to a dry reformer vessel, wherein a reforming catalyst including a nickel component, a ruthenium component, a cerium oxide component, and a gadolinium oxide component is disposed in the dry reformer vessel. The method includes dry reforming the methane in the dry reformer vessel via the reforming catalyst to generate hydrogen and carbon monoxide, and discharging the hydrogen and carbon monoxide from the dry reformer vessel.

Yet another aspect is a dry reformer including a dry reformer vessel having at least one inlet to receive methane and carbon dioxide. The dry reformer vessel has a reforming catalyst including a nickel component, a ruthenium component, a cerium oxide component, and a gadolinium oxide component to convert the methane and the carbon dioxide into syngas. The dry reformer vessel has an outlet to discharge the syngas, wherein the syngas includes hydrogen and carbon monoxide.

The details of one or more implementations are set forth in the accompanying drawings and the description below. Other features and advantages will be apparent from the description and drawings, and from the claims.

DETAILED DESCRIPTION

Provided in the present disclosure is a method of dry reforming methane using a catalyst composition comprising a bi-metallic catalyst, such as a nickel and ruthenium-based catalyst. In some embodiments, the nickel and ruthenium-based catalyst is resistant to carbon formation, demonstrates high activity for dry reforming, and is resistant to sintering. In some embodiments of the method, the catalyst composition comprises a support. In some embodiments, the support has high oxygen vacancy.

Figure 1:
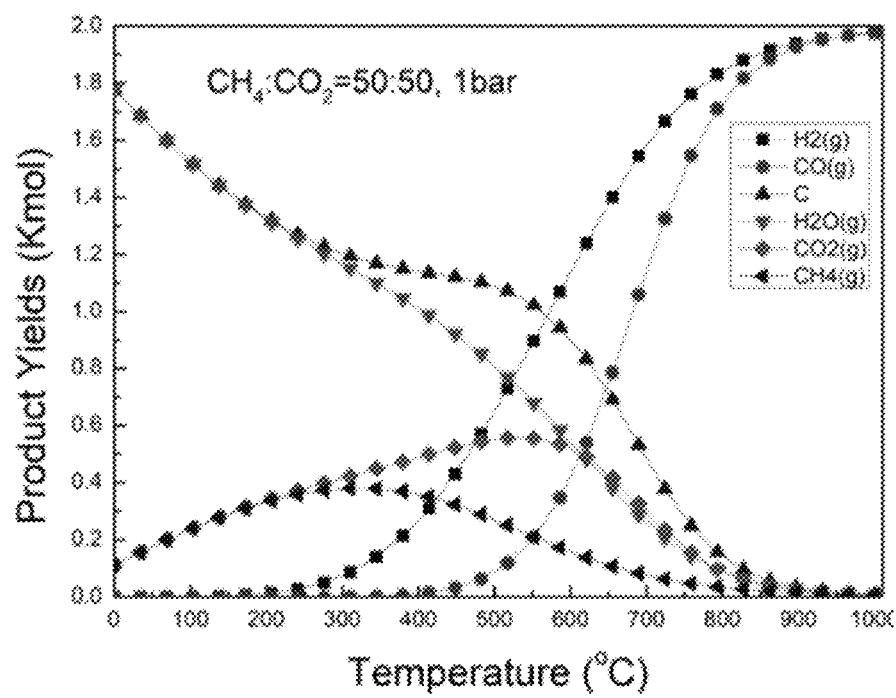
FIG. 1 is a thermodynamic equilibrium plot for the dry reforming of methane ($CH_4:CO_2=1:1$, 1 bar).
Figure 2:
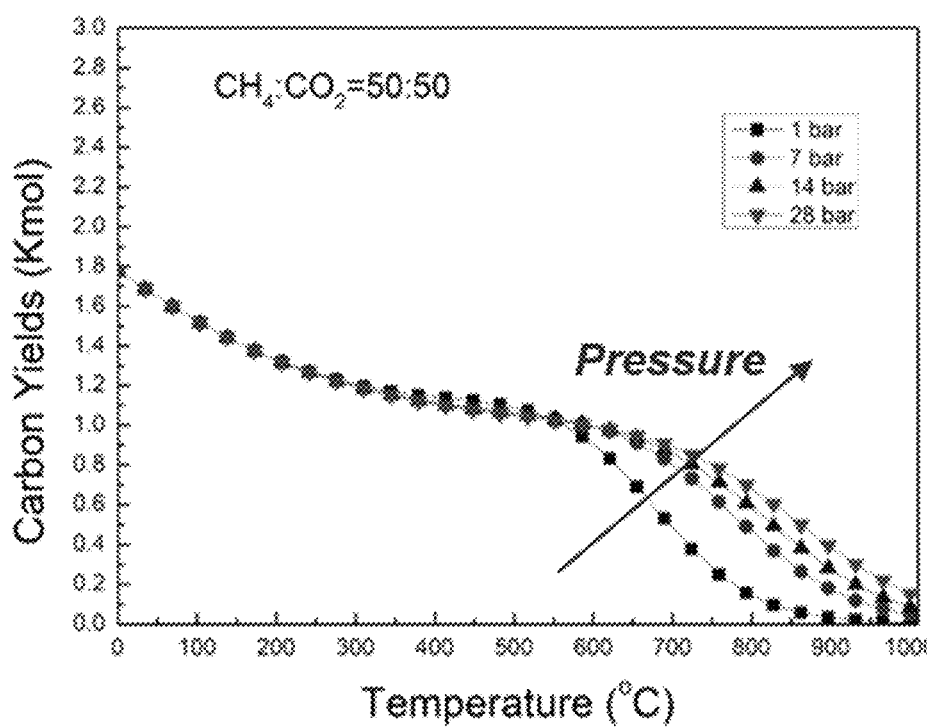
FIG. 2 is a thermodynamic equilibrium plot for solid carbon formation with increasing pressure ($CH_4:CO_2=1:1$).

Carbon formation is thermodynamically favored under dry reforming conditions. To prevent carbon formation, high temperatures are normally required; however, at these high temperatures, metal catalysts are prone to be deactivated due to agglomeration or sintering with the support. FIG. 1 shows a thermodynamic equilibrium plot for dry reforming methane ($CH_4:CO_2=1:1$) at 1 bar while FIG. 2 is a plot showing the solid carbon formation trend with increasing pressure for a 1:1 mixture of $CH_4:CO_2$.

The method of the present disclosure provides a solution to the problem of increased greenhouse gases, including carbon dioxide and methane, by utilizing dry reforming to convert carbon dioxide and methane to synthesis gas, or "syngas" (a mixture of hydrogen ($H_2$) and carbon monoxide (CO)). Thus, the method of the present disclosure utilizes not just one, but two harmful greenhouse gases, $CO_2$ and methane, to produce syngas, an industrially useful gas. Syngas is a starting material building block in many industries, including oil and gas, and also is a suitable fuel for electricity generation in the power industry.

The catalyst composition used in the methods of the present disclosure comprises a nickel (Ni) component, a cerium (Ce) oxide component, a gadolinium (Gd) oxide component, and a ruthenium (Ru) component. The nickel component is an active metal of the catalyst. Addition of a small amount of ruthenium surprisingly has been found to improve the stability of the catalyst composition. While nickel is widely used for catalytic processes because it has high catalytic activity and is inexpensive, nickel is vulnerable to coke formation compared to precious metals such as rhodium, platinum and ruthenium. The cerium and gadolinium components (collectively "CGO" or "Gd-doped $CeO_2$") function as the catalyst support. The CGO is effective to improve the tolerance of the catalyst composition to coke formation. Without wishing to be bound by any particular theory, it is believed that CGO suppresses coke formation on metals because CGO is an ionic conductive material. In some embodiments, the CGO has a high ionic conductivity. Thus, in some embodiments, the catalyst is resistant to the formation of coke on the catalyst during use of the catalyst.

Further, and without wishing to be bound by any particular theory, it is believed that when the reactants ($CO_2$ and $CH_4$) meet the catalyst, the CGO support, which has high oxygen vacancy, can improve the motility of the oxygen ion and provide the oxygen that likely helps to react with the carbon sources, as well as prevent dissociation of the CO. As a result, the particular combination of the bi-metallic catalyst and the CGO support improve the dry reforming reaction.

In some embodiments, the catalyst composition used in the methods of the present disclosure comprises a nickel component present at about 19.5% wt., a cerium oxide component present at about 70% wt., a gadolinium oxide component present at about 10% wt., and a ruthenium component present at about 0.5% wt. In some embodiments, the catalyst composition comprises about 19.5 wt % Ni, about 0.5 wt % Ru, and about 80 wt % $Ce_{0.9}Gd_{0.1}O_{2-x}$. An exemplary catalyst is the catalyst disclosed in U.S. Pat. No. 9,181,148, which is incorporated by reference in its entirety herein.

Thus, in some embodiments, provided is a method of dry reforming methane using a catalyst comprising a nickel component, a cerium oxide component, a gadolinium oxide component, and a ruthenium component, where the catalyst is resistant to the formation of coke on the catalyst during use of the catalyst. In some embodiments of the method, the catalyst comprises a nickel component present at about 19.5% wt., a cerium oxide component present at about 70% wt., a gadolinium oxide component present at about 10% wt., and a ruthenium component present at about 0.5% wt. In some embodiments, the catalyst composition comprises about 19.5 wt % Ni, about 0.5 wt % Ru, and about 80 wt % $Ce_{0.9}Gd_{0.1}O_{2-x}$.

Provided in the present disclosure is a method of dry reforming methane with $CO_2$ using a bi-metallic catalyst comprising a nickel component, a cerium oxide component, a gadolinium oxide component, and a ruthenium component, without the formation of carbon. In some embodiments of the method, the catalyst composition comprises a nickel component present at about 19.5% wt., a cerium oxide component present at about 70% wt., a gadolinium oxide component present at about 10% wt., and a ruthenium component present at about 0.5% wt. In some embodiments, the catalyst composition comprises about 19.5 wt % Ni, about 0.5 wt % Ru, and about 80 wt % $Ce_{0.9}Gd_{0.1}O_{2-x}$.

Also provided in the present disclosure is a method of dry reforming methane with $CO_2$ using a bi-metallic catalyst comprising a nickel component, a cerium oxide component, a gadolinium oxide component, and a ruthenium component, without sintering the catalyst. In some embodiments of the method, the catalyst composition comprises a nickel component present at about 19.5% wt., a cerium oxide component present at about 70% wt., a gadolinium oxide component present at about 10% wt., and a ruthenium component present at about 0.5% wt. In some embodiments, the catalyst composition comprises about 19.5 wt % Ni, about 0.5 wt % Ru, and about 80 wt % $Ce_{0.9}Gd_{0.1}O_{2-x}$.

Also provided is a method of dry reforming methane using a catalyst that is resistant to deactivation due to agglomeration or sintering with the support. Thus, the methods of the present disclosure utilize an efficient and durable catalyst that provides environmental and economic advantages, and overcomes several of the technical challenges that prevent commercialization of dry reforming. In some embodiments of the method, the catalyst composition comprises a nickel component present at about 19.5% wt., a cerium oxide component present at about 70% wt., a gadolinium oxide component present at about 10% wt., and a ruthenium component present at about 0.5% wt. In some embodiments, the catalyst composition comprises about 19.5 wt % Ni, about 0.5 wt % Ru, and about 80 wt % $Ce_{0.9}Gd_{0.1}O_{2-x}$.

The methods of the present disclosure advantageously produce syngas using a dry reforming process of methane with $CO_2$ over an extended period of time without experiencing deactivation of the bi-metallic nickel and ruthenium-based catalyst described in the present disclosure. In some embodiments, the syngas is produced using a dry reforming process of methane with $CO_2$ without experiencing deactivation of the bi-metallic nickel and ruthenium-based catalyst over a period of time of about 8 hours. In some embodiments of the method, the dry reforming process operates under higher pressures than are typically used in dry reforming processes that do not utilize the bi-metallic nickel and ruthenium-based catalyst described in the present disclosure, such as higher than typical pressures of up to about 30 bar.

In some embodiments, provided is a method of dry reforming methane with $CO_2$ that results in increased conversion of reactants (methane and $CO_2$) as compared to dry reforming methods that do not use the bi-metallic nickel and ruthenium-based catalyst described in the present disclosure. Methane and $CO_2$ conversions are dependent on temperature and pressure. In some embodiments, methane conversions increase with increased temperature and achieve equilibrium conversions with active catalysts. In some embodiments, the bi-metallic catalyst achieves equilibrium conversion for both methane and $CO_2$ up to pressures of about 14 bar and temperatures up to about 700° C. In some embodiments, the dry reforming has a conversion for both methane and $CO_2$ of at least about 50%, at least about 60%, at least about 70%, or at least about 80% at pressures up to about 14 bar or greater and temperatures up to about 700° C. or higher.

In some embodiments, the bi-metallic catalyst is activated prior to use in the dry reforming process. In some embodiments, the catalyst is activated by reducing the catalyst with hydrogen ($H_2$) and nitrogen ($N_2$) at about 700-800° C. for about 3-6 hours, such that the catalyst is activated. In some embodiments, the hydrogen ($H_2$) is present in an amount up to about 30% wt and the remainder is nitrogen ($N_2$). For example, the amount of hydrogen present is about 1 wt % to about 30 wt %, about 5 wt % to about 30 wt %, about 10 wt % to about 30 wt %, about 15 wt % to about 30 wt %, about 20 wt % to about 30 wt %, about 25 wt % to about 30 wt %, about 1 wt % to about 25 wt %, about 5 wt % to about 25 wt %, about 10 wt % to about 25 wt %, about 15 wt % to about 25 wt %, about 20 wt % to about 25 wt %, about 1 wt % to about 20 wt %, about 5 wt % to about 20 wt %, about 10 wt % to about 20 wt %, about 15 wt % to about 20 wt %, about 1 wt % to about 15 wt %, about 5 wt % to about 15 wt %, about 10 wt % to about 15 wt %, about 1 wt % to about 10 wt %, about 5 wt % to about 10 wt %, or about 1 wt % to about 5 wt %, and the remainder is nitrogen. In some embodiments, the hydrogen is about 30% wt. In other embodiments, the nitrogen is about 70% wt. In some embodiments, pretreatment, or activation, of the catalyst compositions is necessary as nickel converts to a non-active form of nickel oxide during the preparation of the catalyst compositions.

The methods of the present disclosure produce $H_2$ and CO. In some embodiments, renewable hydrogen is introduced to the product. In some embodiments, addition of renewable hydrogen adjusts the ratio of $H_2$ to CO by increasing the amount of $H_2$. In some embodiments, this allows for application of the product directly to other downstream processes. In some embodiments, the downstream process is liquid hydrocarbon synthesis. In some embodiments, the downstream process is liquid hydrocarbon synthesis through the Fischer-Tropsch process.

The catalyst composition of the present disclosure can be prepared using a glycine nitrate process ("GNP"), such as disclosed in U.S. Pat. No. 9,181,148, and incorporated by reference in its entirety herein. In some embodiments, the process includes adding stoichiometric amounts of $Ce(NO_3)_3 \cdot 6H_2O$, $Gd(NO_3)_3 \cdot 6H_2O$, $Ni(NO_3)_2 \cdot 6H_2O$, and $Ru(NO)(NO_3)_3$ to de-ionized water to create a dissolved solution. Glycine is added to the dissolved solution to create a glycine-dissolved solution. The glycine-dissolved solution is heated such that excess water is evaporated, combustion is initiated, and a catalyst powder is produced. The catalyst powder is calcined in air at 800° C. for 4 hours. The resulting powder after the combustion is calcinated in order to stabilize the active metal and form the phase of CGO ($Ce_{0.9}Gd_{0.1}O_{2-x}$). To effectively suppress coke formation, the phase of CGO should be formed during the calcination.

Glycine is used as a fuel for glycine nitrate process, and after the combustion, the glycine should be combusted. Therefore, the amount and purity of glycine are less important than other elements. However, in some embodiments, a 1:1.5 nitrate:glycine molar ratio is used for the process. In some embodiments a ≥99% purity glycine is used. In further embodiments, the molar ratio of glycine to $NO_3$ of the glycine-dissolved solution is about 1.4. In further embodiments, the molar ratio of glycine to $NO_3$ of the glycine-dissolved solution is about 1.6.

In some embodiments, the catalyst powder is shaped into a form for use in the dry reforming process of converting methane and $CO_2$ into $H_2$ and CO. In some embodiments, the form is catalyst pellets. A person of skill in the art will understand the various forms in to which the catalysts could be shaped, and will understand how to select the best form for a given reactor and process. In some embodiments, the catalyst powder is pelletized using a hydraulic press. A person of skill in the art will understand the various other methods that can be used to shape catalysts.

As referred to herein, dry reforming is a process that reacts $CH_4$ with $CO_2$ to produce synthesis gas (syngas) with the aid of a catalyst. Dry reforming can be beneficial for consuming the two greenhouse gases ($CH_4$ and $CO_2$) to produce syngas, which can include hydrogen ($H_2$) and carbon monoxide (CO). The dry reforming reaction can be characterized as $CH_4 + CO_2 \rightarrow 2H_2 + 2CO$. In the methods of the present disclosure, dry reforming is processed on a reforming catalyst comprising a nickel component, a ruthenium component, a cerium oxide component, and a gadolinium component.

Figure 3:
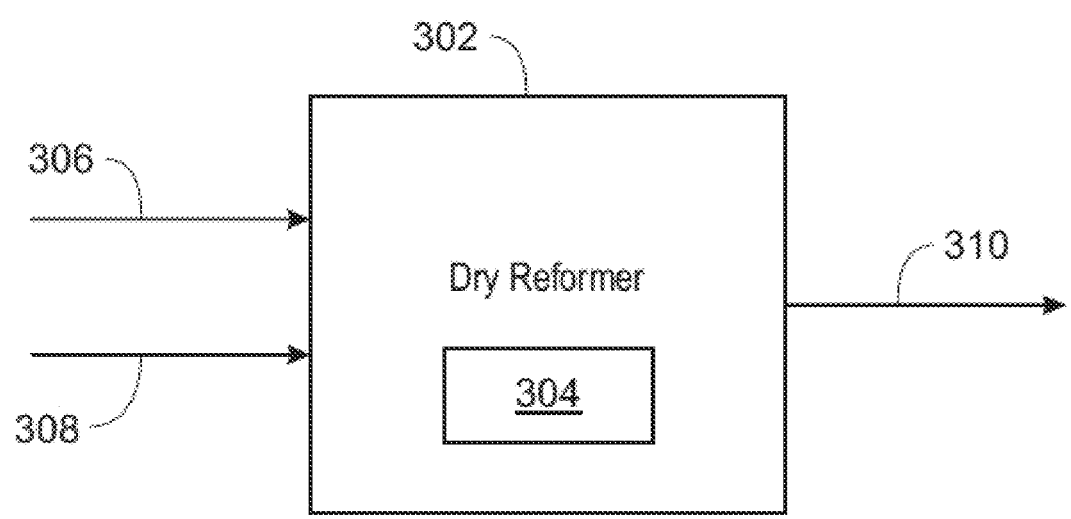
FIG. 3 is a diagram of a dry reformer for dry reforming methane.

FIG. 3 is a dry reformer 300 (including a dry reformer vessel 302) to convert $CH_4$ in the presence of $CO_2$ and reforming catalyst 304 into syngas. The dry reformer 300 may be a dry reformer system. The dry reformer 300 or dry reformer vessel 302 may be characterized as a dry reformer reactor or dry reformer reactor vessel, respectively, for the dry reforming of methane to give syngas. A reforming catalyst 304 that is a bi-metallic nickel and ruthenium-based catalyst, as described in the present application, is disposed in the dry reformer vessel 302. The reforming catalyst 304 may be activated by reducing the catalyst with hydrogen ($H_2$) and nitrogen ($N_2$) at about 700-800° C. for about 3-6 hours, such that the catalyst is activated.

The dry reformer 300 may be, for instance, a fixed-bed reactor or a fluidized bed reactor. The dry reformer vessel 302 may be a fixed-bed reactor vessel having the reforming catalyst 304 in a fixed bed. In implementations, the fixed-bed reactor vessel may be a multi-tubular fixed-bed reactor. The dry reformer vessel 302 may be a fluidized-bed reactor vessel that operates with a fluidized bed of the reforming catalyst 304.

The operating temperature of the dry reformer 300 (the operating temperature in the dry reformer vessel 302) may be, for example, in the ranges of about 500° C. to about 1100° C., about 500° C. to about 1000° C., about 500° C. to about 900° C., at least about 500° C., less than about 1000° C., or less than about 900° C. The dry reforming reaction may generally be endothermic. The dry reformer vessel 302 (dry reformer reactor vessel) may have a jacket for heat transfer and temperature control. In operation, a heat transfer fluid (heating medium) may flow through the jacket for temperature control of the dry reformer 300 including the dry reformer vessel 302. Heat transfer may generally occur from the heat transfer fluid in the jacket to the dry reforming reaction mixture (process side of the dry reformer vessel 302). In other embodiments, electrical heaters may provide heat for the endothermic dry reforming reaction. The electrical heaters may be disposed in the dry reformer vessel 302 or on an external surface of the dry reformer vessel 302. In yet other embodiments, the dry reformer vessel 302 may be disposed in a furnace (for example, a direct fired heater) to receive heat from the furnace for the dry reforming reaction and for temperature control of the dry reformer 300. Other configurations of heat transfer and temperature control of the dry reformer 300 are applicable.

The operating pressure in the dry reformer vessel 302 may be, for example, in the range of about 1 bar to about 28 bar, or less than about 30 bar. In some embodiments, the operating pressure may be greater than about 30 bar to provide additional motive force for flow of the discharged syngas 310 to downstream processing. The downstream processing may include, for example, a Fischer-Tropsch (FT) system having a FT reactor vessel. The CO gas in the syngas 310 can be subjected to a water-gas shift reaction to obtain additional hydrogen.

In operation, the dry reformer vessel 302 may receive methane 306 and carbon dioxide 308. While the methane 306 and the carbon dioxide 308 are depicted as introduced separately into the dry reformer vessel 302, the methane 306 and carbon dioxide 308 may be introduced together as combined feed to the dry reformer vessel 302. The methane 306 stream may be or include natural gas. In other examples, the methane 306 stream includes $CH_4$ but is not a natural-gas stream. The methane 306 may be a process stream or waste stream having $CH_4$. The methane 306 stream may include $CH_4$, propane, butane, and hydrocarbons having a greater number of carbons. The methane 306 stream may include a mixture of hydrocarbons (e.g., C1 to C5), liquefied petroleum gas (LPG), and so on. Additional implementations of the methane 306 stream (for example, having $CH_4$) are applicable.

The dry reforming of the methane 306 via the $CO_2$ 308 and reforming catalyst 304 may give syngas 310 having $H_2$ and CO. The dry reforming reaction via the catalyst 304 in the dry reformer vessel 302 may be represented by $CH_4 + CO_2 \rightarrow 2H_2 + 2CO$. The molar ratio of $H_2$ to CO in the syngas 310 based on the ideal thermodynamic equilibrium is 1:1 but in practice can be different than 1:1. Unreacted $CH_4$ may discharge in the syngas 310 stream. In some implementations, unreacted $CH_4$ may be separated from the discharged syngas 310 and recycled to the dry reformer vessel 302. Moreover, the generated CO may be subjected to a water-gas shift reaction to obtain additional $H_2$, as given by $CO + H_2O \Leftrightarrow CO_2 + H_2$. The water-gas shift reaction may be performed in the dry reformer vessel 302. The reforming catalyst 304 may promote the water-gas shift reaction if implemented. The water-gas shift reaction may instead be implemented downstream. The discharged syngas 310 may be processed to implement the water-gas shift reaction downstream of the dry reformer vessel 302. Utilization of the water-gas shift reaction, whether performed in the dry reformer vessel 302 or downstream of the dry reformer vessel 302, may be beneficial to increase the molar ratio of $H_2/CO$ in the syngas 310 for downstream processing of the syngas 310. The downstream processing may include, for example, an FT reactor or other processing. In certain implementations, the molar ratio of $H_2/CO$ may also be increased with the addition of supplemental $H_2$ (e.g., from water electrolysis) to the discharged syngas 310.

The dry reformer 300 system includes feed conduits for the hydrocarbon 306 and the carbon dioxide 308, and a discharge conduit for the syngas 310. The dry reformer vessel 302 may be, for example, stainless steel. The dry reformer 302 vessel has one or more inlets to receive the feeds (e.g., 306, 308). The inlet(s) may be, for example, a nozzle having a flange or threaded (screwed) connection for coupling to a feed conduit conveying the feed to the dry reformer vessel 302. The vessel 302 may have an outlet (e.g., a nozzle with a flanged or screwed connection) for the discharge of produced syngas 310 through a discharge conduit for distribution or downstream processing. The flow rate (e.g., volumetric rate, mass rate, or molar rate) of the feed 306, 308 may be controlled via flow control valve(s) (disposed along respective supply conduits) or by a mechanical compressor, or a combination thereof. The ratio (e.g., molar, volumetric, or mass ratio) of the methane 306 to the carbon dioxide 308 may be adjusted by modulating (e.g., via one or more control valves) at least one of the flow rates of the methane 306 or the $CO_2$ 308. Lastly, the present dry reforming may be a technique for conversion of $CH_4$ and $CO_2$ into syngas without the introduction of oxygen ($O_2$) other than the less than about 1 wt % that might be present as a residual or contaminant in the feed 306. Thus, embodiments of the dry reforming do not include autothermal reforming (ATR). Further, embodiments of the dry reforming do not include steam reforming.

An embodiment is a dry reformer including a dry reformer vessel. The dry reformer vessel has at least one inlet to receive methane and $CO_2$. The dry reformer vessel has a reforming catalyst disposed in the vessel to convert the methane and $CO_2$ into syngas. The reforming catalyst includes or is a composition comprising a nickel component, a cerium oxide component, a gadolinium oxide component, and a ruthenium component, without sintering the catalyst. In some embodiments of the method, the catalyst composition comprises a nickel component present at about 19.5% wt., a cerium oxide component present at about 70% wt., a gadolinium oxide component present at about 10% wt., and a ruthenium component present at about 0.5% wt. In some embodiments, the catalyst composition comprises about 19.5 wt % Ni, about 0.5 wt % Ru, and about 80 wt % $Ce_{0.9}Gd_{0.1}O_{2-x}$. The dry reformer vessel has an outlet to discharge the syngas, wherein the syngas includes $H_2$ and CO. The dry reformer vessel may be a fixed-bed reactor vessel having the reforming catalyst in a fixed bed. If so, the fixed-bed reactor vessel may be a multi-tubular fixed-bed reactor. The dry reformer vessel may be a fluidized-bed reactor vessel to operate with a fluidized bed of the reforming catalyst.

Figure 4:
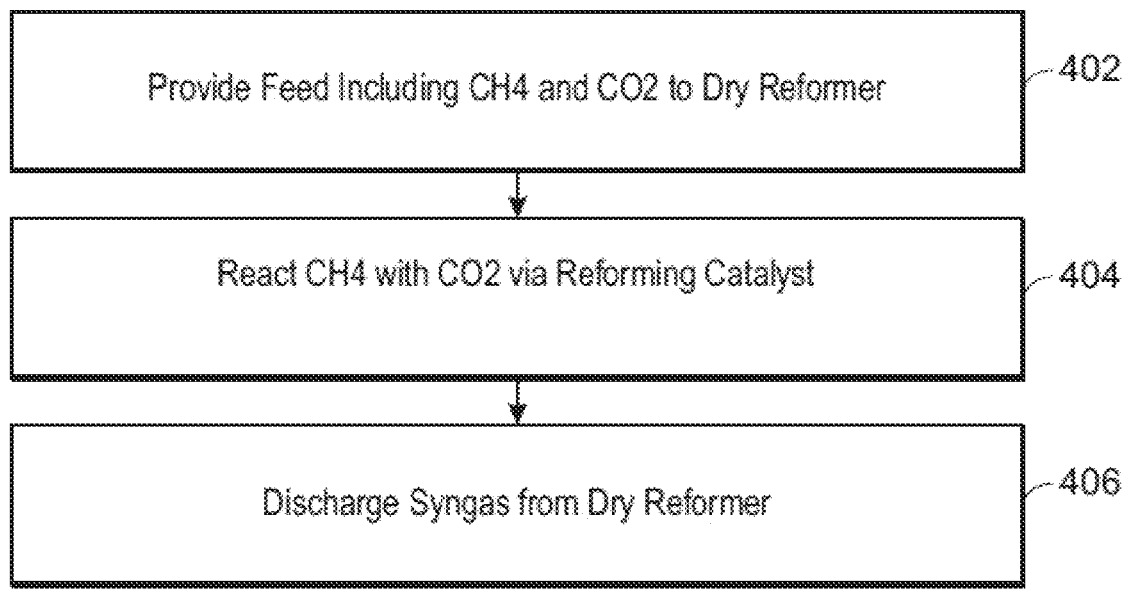
FIG. 4 is a block flow diagram of a method of dry reforming methane.

FIG. 4 is a method 400 of dry reforming methane. The methane feed can be or include natural gas. The methane feed may be a process stream or waste stream having $CH_4$. The methane feed may include $CH_4$, propane, butane, and hydrocarbons having a greater number of carbons.

At block 402, the method includes providing the methane feed and $CO_2$ to a dry reformer (e.g., to a dry reformer vessel). Reforming catalyst that is or includes a catalyst composition comprising a nickel component, a cerium oxide component, a gadolinium oxide component, and a ruthenium component is disposed in the dry reformer vessel. The catalyst composition may be the bi-metallic nickel and ruthenium-based catalyst composition as described in the present disclosure. The reforming catalyst may be a catalyst composition comprising a nickel component present at about 19.5% wt., a cerium oxide component present at about 70% wt., a gadolinium oxide component present at about 10% wt., and a ruthenium component present at about 0.5% wt. The reforming catalyst may be a catalyst composition that comprises about 19.5 wt % Ni, about 0.5 wt % Ru, and about 80 wt % $Ce_{0.9}Gd_{0.1}O_{2-x}$.

At block 404, the method include dry reforming the methane in the dry reformer via the reforming catalyst to generate $H_2$ and CO. The dry reforming involves reacting the methane with the $CO_2$ via the reforming catalyst. The method may include providing heat to the dry reformer (e.g., to the dry reformer vessel) for the dry reforming, wherein the reacting of the methane with the $CO_2$ is endothermic. Heat may be provided by external electrical heaters residing on the surface of the dry reformer vessel. Heat may be provided by disposing the dry reformer vessel in a furnace. Other techniques for providing heat to the dry reformer are applicable.

At block 406, the method includes discharging the $H_2$ and CO from the dry reformer (e.g., from the dry reformer vessel). The discharged stream having the $H_2$ and CO may be labeled as syngas. The syngas may be sent to transportation or distribution. The syngas may be sent to downstream processing. In some embodiments, supplemental $H_2$ may added to the syngas to increase the molar ratio of $H_2$ to CO in the syngas. In certain embodiments, the water-gas shift reaction may be implemented in the dry reformer vessel or downstream of the dry reformer vessel to generate additional $H_2$ to increase the molar ratio of $H_2$ to CO in the syngas.

An embodiment is a method of dry reforming methane. The method includes reacting the method with $CO_2$ via a reforming catalyst to generate syngas including $H_2$ and CO. The reforming catalyst is or includes a catalyst composition comprising a nickel component, a cerium oxide component, a gadolinium oxide component, and a ruthenium component is disposed in the dry reformer vessel. The catalyst composition may be the bi-metallic nickel and ruthenium-based catalyst composition as described in the present disclosure. The reforming catalyst may be a catalyst composition comprising a nickel component present at about 19.5% wt., a cerium oxide component present at about 70% wt., a gadolinium oxide component present at about 10% wt., and a ruthenium component present at about 0.5% wt. The reforming catalyst may be a catalyst composition that comprises about 19.5 wt % Ni, about 0.5 wt % Ru, and about 80 wt % $Ce_{0.9}Gd_{0.1}O_{2-x}$.

The term "about" as used herein can allow for a degree of variability in a value or range, for example, within 10%, within 5%, or within 1% of a stated value or of a stated limit of a range.

Examples

The nickel and ruthenium based catalyst of the present disclosure is prepared according to the method described in U.S. Pat. No. 9,181,148, incorporated by reference in its entirety herein. For example, the Nickel/Ruthenium/CGO catalysts are prepared by adding $Ce(N_{O3})_3 \cdot 6H_2O$, $Gd(NO_3)_3 \cdot 6H_2O$, $Ni(NO_3)_2 \cdot 6H_2O$, and $Ru(NO)(NO_3)_3$ to de-ionized water to create a dissolved solution. The amount of each nitrate is stoichiometrically calculated. For example, to make 19.5% Ni-0.5% Ru/CGO catalyst, the molar ratio of the four components is $Ce(NO_3)_3 \cdot 6H_2O:Gd(NO_3)_3 \cdot 6H_2O:Ni(NO_3)_2 \cdot 6H_2O:Ru(NO)(NO_3)_3=0.9:0.1:0.7218:0.01075$. Glycine is added to the dissolved solution to create a glycine-dissolved solution. A 1:1.5 nitrate:glycine molar ratio is used. The glycine-dissolved solution is heated about 2 hours to vaporize excess water, and spontaneous combustion begins at approximately 180° C. During the combustion, the internal temperature may suddenly to above 1000° C. The combustion is completed in a few minutes and the catalyst power is produced. The catalyst powder is shaped into a pellet and then calcined in air, increasing the temperature to 800° C. over a period of about 4 hours, then maintaining the temperature at about 800° C. for 4 hours. After the calcination, calcined catalyst was ground uniformly with mortar and then shaped again into the pellet. The catalyst particles having 250 to 500 m particle size are selected with sieves.

Figures 9A, 9B, 9C:
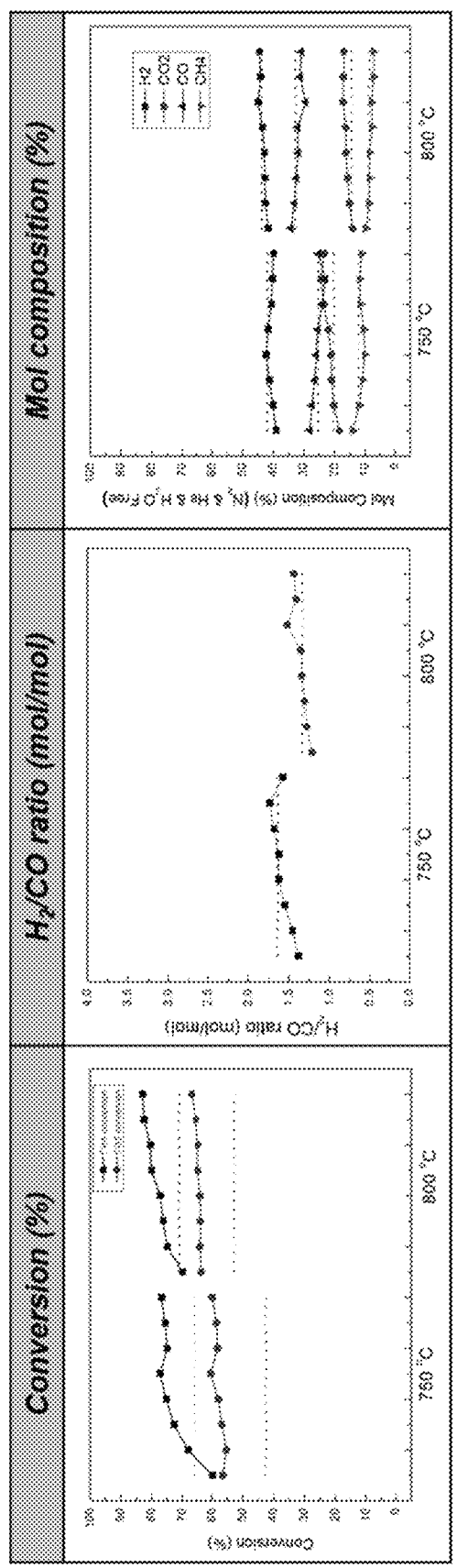

Various tests of dry reforming $CH_4$ with $CO_2$ were performed in a micro-reactor in the laboratory. The micro-reactor was a stainless-steel tube having a nominal diameter of 2 millimeters (mm). The micro-reactor was mounted in a furnace. The dry-reforming tests with the micro-reactor were carried out at various temperatures and pressures for 24 hours. The catalyst in the micro-reactor was the catalyst composition comprising 19.5 wt % Ni, 0.5 wt % Ru, and 80 wt % $Ce_{0.9}Gd_{0.1}O_{2-x}$. Approximately 50 milligrams (mg) of the catalyst was added to the micro-reactor. The test included introducing a feed of $CH_4$, $CO_2$, nitrogen ($N_2$), and helium (He) to the micro-reactor by a mass flow controller for the 24 hours. The ratio $CH_4:CO_2:N_2:H_2$ of the feed in volume percent was 30:31:31:8 (FIGS. 5-7) or 16:48:32:4 (FIG. 9). The gas hour space velocity (GHSV) through the catalyst was 1500 $h^{-1}$. The temperature of micro-reactor was increased up to the target temperature at a ramp of 10° C. per minute and was maintained during the reaction. Online gas chromatography was employed to determine composition of the effluent gas discharged from the micro-reactor. Composition of effluent gas was analyzed with online gas chromatography in order to calculate conversions and the $H_2/CO$ ratio. In one test (FIGS. 9A-9C), water was added to the feed mixture to increase the amount of $H_2/CO$ ratio.

Figures 5A, 5B, 5C:
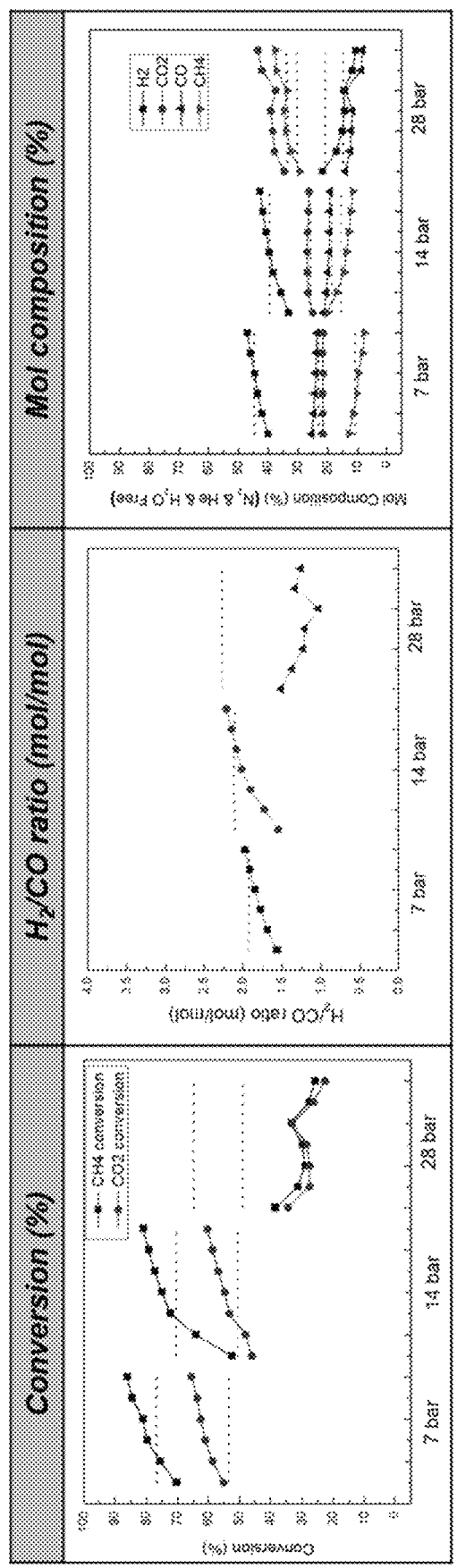
FIGS. 5A-5C, 6A-6C, 7A-7C, 8A-8C, and 9A-9C are plots of results of the Examples.

A dry reforming reaction as described above was performed at 700° C. and 7 bar, 14, or 28 bar, for 24 hours. The volume percent of $CH_4$ and $CO_2$ in the feed (on a nitrogen-free and helium-free basis) was 50:50. The catalyst composition was pre-treated prior to the dry reforming reaction by heating at 700° C. for 3 hours. FIG. 5A is a plot of $CH_4$ and $CO_2$ conversion (%) over time (hours) at 7 bar, 14 bar, or 28 bar at 700° C. FIG. 5B is a plot of the $H_2/CO$ ratio (mol/mol) over time (hours) at 7 bar, 14 bar, or 28 bar at 700° C. FIG. 5C is a plot of mol composition (%) of the reactants and products over time (hours) at 7 bar, 14 bar, or 28 bar at 700° C. The thermodynamic equilibrium is shown as a dotted line in each plot. The results at each pressure tested are shown in Table 1.

TABLE 1

|  | 7 bar | 14 bar | 28 bar |
|---|---|---|---|
| Ave. $CH_4$ conversion (%) | 79.7 | 71.8 | 30.8 |
| Ave. $CO_2$ conversion (%) | 61.1 | 54.1 | 28.7 |
| Ave. $H_2/CO$ ratio (mol/mol) | 1.8 | 2.0 | 1.3 |
| Ave. $H_2$ (mol %) | 45.9 | 40.9 | 16.7 |
| Ave. $CO_2$ (mol %) | 18.9 | 23.8 | 35.7 |
| Ave. CO (mol %) | 25.5 | 21.0 | 13.0 |
| Ave. $CH_4$ (mol %) | 9.7 | 14.2 | 34.7 |

Figures 6A, 6B, 6C:
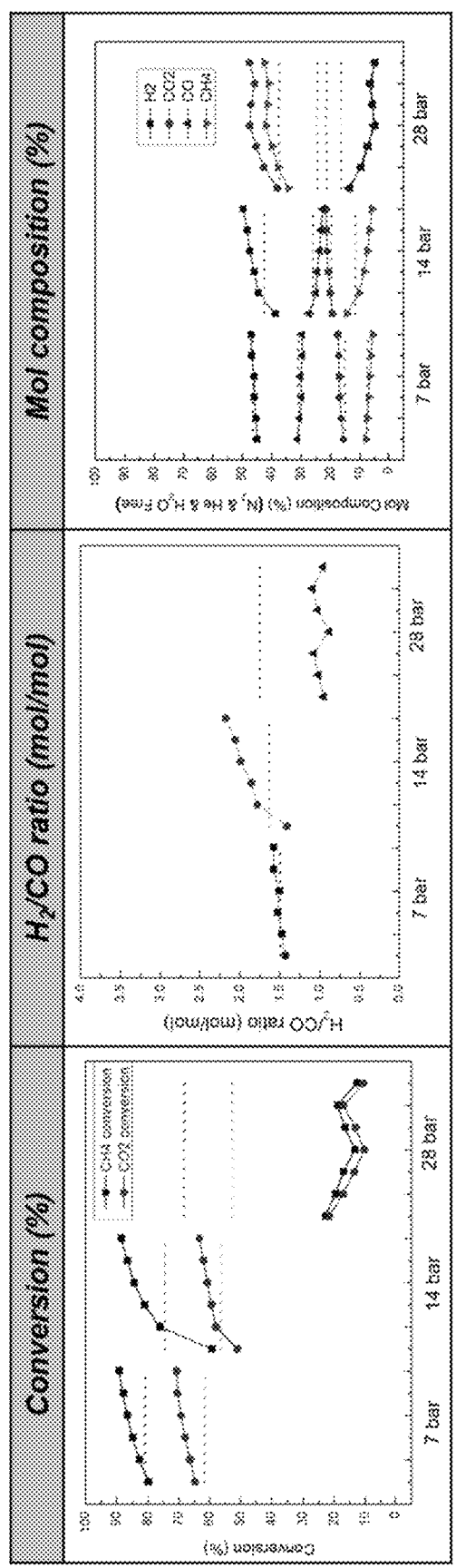

A dry reforming reaction as described above was performed at 750° C. and 7 bar, 14, or 28 bar, for 24 hours. The volume percent of $CH_4$ and $CO_2$ in the feed (on a nitrogen-free and helium-free basis) was 50:50. The catalyst composition was pre-treated prior to the dry reforming reaction by heating at 750° C. for 3 hours. FIG. 6A is a plot of $CH_4$ and $CO_2$ conversion (%) over time (hours) at 7 bar, 14 bar, or 28 bar at 750° C. FIG. 6B is a plot of the $H_2/CO$ ratio (mol/mol) over time (hours) at 7 bar, 14 bar, or 28 bar at 750° C. FIG. 6C is a plot of mol composition (%) of the reactants and products over time (hours) at 7 bar, 14 bar, or 28 bar at 750° C. The thermodynamic equilibrium is shown as a dotted line in each plot. The results at each pressure tested are shown in Table 2.

TABLE 2

|  | 7 bar | 14 bar | 28 bar |
|---|---|---|---|
| Ave. $CH_4$ conversion (%) | 85.1 | 79.2 | 16.1 |
| Ave. $CO_2$ conversion (%) | 67.0 | 57.6 | 17.2 |
| Ave. $H_2/CO$ ratio (mol/mol) | 1.5 | 1.9 | 1.0 |
| Ave. $H_2$ (mol %) | 46.0 | 45.8 | 7.7 |
| Ave. $CO_2$ (mol %) | 16.8 | 20.8 | 44.8 |
| Ave. CO (mol %) | 30.2 | 24.5 | 7.7 |
| Ave. $CH_4$ (mol %) | 6.9 | 9.0 | 39.8 |

Figures 7A, 7B, 7C:
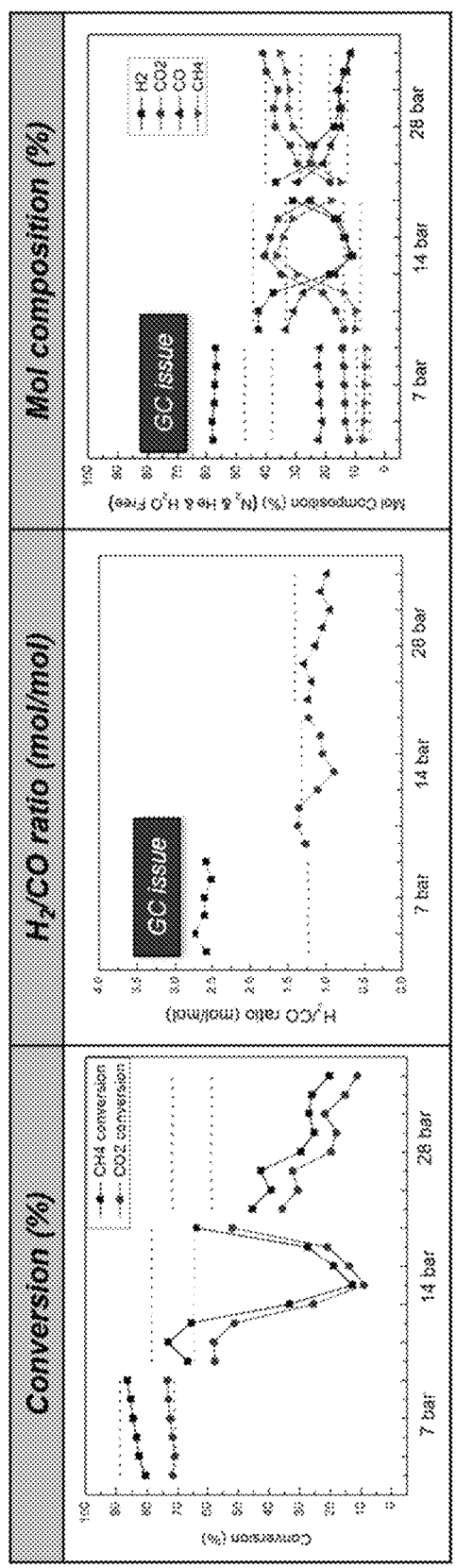

A dry reforming reaction as described above was performed at 800° C. and 7 bar, 14, or 28 bar, for 24 hours. The volume percent of $CH_4$ and $CO_2$ in the feed (on a nitrogen-free and helium-free basis) was 50:50. The catalyst composition was pre-treated prior to the dry reforming reaction by heating at 800° C. for 3 hours. FIG. 7A is a plot of $CH_4$ and $CO_2$ conversion (%)) over time (hours) at 7 bar, 14 bar, or 28 bar at 800° C. FIG. 7B is a plot of the $H_2/CO$ ratio (mol/mol) over time (hours) at 7 bar, 14 bar, or 28 bar at 800° C. FIG. 7C is a plot of 1 mol composition (%) of the reactants and products over time (hours) at 7 bar, 14 bar, or 28 bar at 800° C. The thermodynamic equilibrium is shown as a dotted line in each plot. The results at each pressure tested are shown in Table 3.

TABLE 3

|  | 7 bar | 14 bar | 28 bar |
|---|---|---|---|
| Ave. $CH_4$ conversion (%) | 84.5 | 46.01 | 26.7 |
| Ave. $CO_2$ conversion (%) | 71.3 | 34.9 | 24.9 |

TABLE 3-continued

|  | 7 bar | 14 bar | 28 bar |
|---|---|---|---|
| Ave. $H_2$/CO ratio (mol/mol) | 2.6 | 1.2 | 1.1 |
| Ave. $H_2$ (mol %) | 57.4 | 26.8 | 19.9 |
| Ave. $CO_2$ (mol %) | 13.6 | 28.4 | 34.0 |
| Ave. CO (mol %) | 22.0 | 21.8 | 17.4 |
| Ave. $CH_4$ (mol %) | 7.1 | 23.0 | 28.7 |

Figures 8A, 8B, 8C:
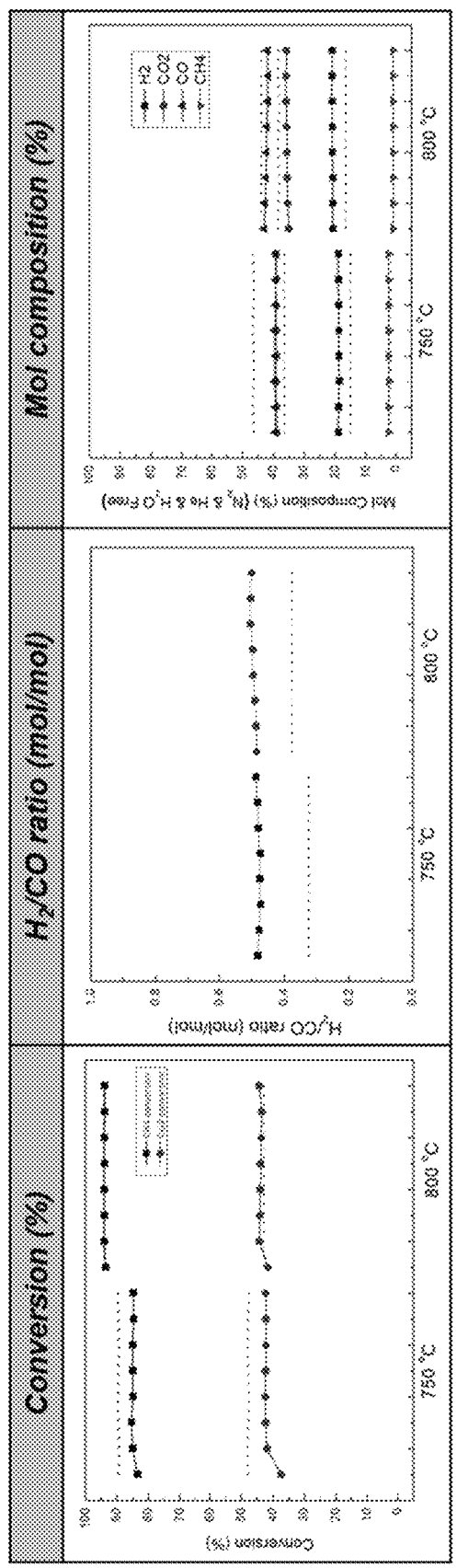

A dry reforming reaction as described above was performed at 750° C. and 14 bar for 24 hours or 800° C. and 14 bar for 24 hours. The volume percent of $CH_4$ and $CO_2$ in the feed (on a nitrogen-free and helium-free basis) was 25:75. The catalyst composition was pre-treated prior to the dry reforming reaction by heating at 800° C. for 6 hours at 14 bar. FIG. 8A is a plot of $CH_4$ and $CO_2$ conversion (%) over time (hours) at 14 bar at 750° C. and 800° C. FIG. 8B is a plot of the $H_2$/CO ratio (mol/mol) over time (hours) at 14 bar at 750° C. and 800° C. FIG. 8C is a plot of mol composition (%) of the reactants and products over time (hours) at 14 bar at 750° C. and 800° C. The thermodynamic equilibrium is shown as a dotted line in each plot. The results at each temperature tested are shown in Table 4.

TABLE 4

|  | 750° C. | 800° C. |
|---|---|---|
| Ave. $CH_4$ conversion (%) | 84.9 | 94.1 |
| Ave. $CO_2$ conversion (%) | 41.7 | 43.8 |
| Ave. $H_2$/CO ratio (mol/mol) | 0.5 | 0.5 |
| Ave. $H_2$ (mol %) | 19.0 | 21.0 |
| Ave. $CO_2$ (mol %) | 39.2 | 35.7 |
| Ave. CO (mol %) | 39.5 | 42.4 |
| Ave. $CH_4$ (mol %) | 2.4 | 0.9 |

A dry reforming reaction as described above was performed at 750° C. and 14 bar for 24 hours or 800° C. and 14 bar for 24 hours. The volume percent of $CH_4$, $CO_2$, and water in the feed (on a nitrogen-free and helium-free basis) was 40:40:20. The catalyst composition was pre-treated prior to the dry reforming reaction by heating at 800° C. for 6 hours at 14 bar. FIG. 9A is a plot of $CH_4$ and $CO_2$ conversion (%) over time (hours) at 14 bar at 750° C. and 800° C. FIG. 9B is a plot of the $H_2$/CO ratio (mol/mol) over time (hours) at 14 bar at 750° C. and 800° C. FIG. 9C is a plot of mol composition (%) of the reactants and products over time (hours) at 14 bar at 750° C. and 800° C. The thermodynamic equilibrium is shown as a dotted line in each plot. The results at each temperature tested are shown in Table 5.

TABLE 5

|  | 750° C. | 800° C. |
|---|---|---|
| Ave. $CH_4$ conversion (%) | 72.7 | 78.1 |
| Ave. $CO_2$ conversion (%) | 58.1 | 64.7 |
| Ave. $H_2$/CO ratio (mol/mol) | 1.6 | 1.36 |
| Ave. $H_2$ (mol %) | 40.8 | 43.5 |
| Ave. $CO_2$ (mol %) | 21.8 | 16.2 |
| Ave. CO (mol %) | 25.8 | 32.0 |
| Ave. $CH_4$ (mol %) | 11.6 | 8.3 |

As can be seen by the results described in the Examples and shown in FIGS. 5-9, the catalyst gave good conversions of $CH_4$ and $CO_2$ at the dry-reforming pressures tested, particularly at 7 bar and 14 bar, and at the various temperatures tested. The catalyst showed strong performance at pressures up to about 14 bar and in the 700° C.-900° C. temperature range.

A number of embodiments have been described. Nevertheless, it will be understood that various modifications may be made without departing from the spirit and scope of the disclosure.

What is claimed is:

1. A method of dry reforming methane, comprising reacting the methane with carbon dioxide via a reforming catalyst at a temperature of 700-900° C. and a pressure of 7 bar to 14 bar to generate synthesis gas comprising hydrogen and carbon monoxide, wherein the reforming catalyst comprises:
   19.5 wt % of a nickel component;
   0.5 wt % of a ruthenium component;
   and
   80 wt % of a cerium and gadolinium oxide component.

2. The method of claim 1, wherein the cerium and gadolinium oxide component is $Ce_{0.9}Gd_{0.1}O_{2-x}$.

3. The method of claim 1, wherein the catalyst is resistant to the formation of coke on the catalyst during use of the catalyst.

4. The method of claim 1, comprising prior to the reacting, exposing the reforming catalyst to hydrogen and nitrogen at 700-800° C. for 3-6 hours.

5. The method of claim 1, wherein the methane is converted to synthesis gas at a conversion rate of 70% or greater based on an initial concentration of methane.

6. The method of claim 1, wherein the methane is in a methane-containing fluid stream, and wherein the methane-containing fluid stream further comprises propane and butane.

7. The method of claim 1, wherein a volume ratio of the methane and carbon dioxide during the reacting is 1:1 to 1:3.

8. The method of claim 1, wherein the methane and carbon dioxide are reacted via the reforming catalyst at a temperature of 700° C. and a pressure of 7 to 14 bar, and wherein the methane is converted to synthesis gas at a conversion rate of 71 to 80%.

9. The method of claim 8, wherein a molar ratio of the hydrogen and carbon monoxide present in the synthesis gas is 1.8:1 to 1.9:1.

10. The method of claim 1, wherein the methane and carbon dioxide are reacted via the reforming catalyst at a temperature of 750° C. and a pressure of 7 to 14 bar, and wherein the methane is converted to synthesis gas at a conversion rate of 79 to 85%.

11. The method of claim 10, wherein a molar ratio of the hydrogen and carbon monoxide present in the synthesis gas is 1.5:1 to 1:2.

12. The method of claim 1, wherein the methane and carbon dioxide are reacted via the reforming catalyst at a temperature of 800° C. and a pressure of 7 bar, and wherein the methane is converted to synthesis gas at a conversion rate of 70 to 90%.

13. The method of claim 12, wherein a molar ratio of the hydrogen and carbon monoxide present in the synthesis gas is 1.5:1 to 1:2.

14. A method of dry reforming method, comprising:
   providing methane and carbon dioxide to a dry reformer vessel, wherein a reforming catalyst comprising 19.5 wt % of a nickel component, 0.5 wt % of a ruthenium component, and 80 wt % of a cerium and gadolinium oxide component is disposed in the dry reformer vessel;
   dry reforming the methane in the dry reformer vessel via the reforming catalyst at a temperature of 700-900° C. and a pressure of 7 bar to 14 bar to generate hydrogen and carbon monoxide; and
   discharging the hydrogen and carbon monoxide from the dry reformer vessel.

15. The method of claim 14, wherein the cerium and gadolinium oxide component is $Ce_{0.9}Gd_{0.1}O_{2-x}$.

16. The method of claim 14, wherein the dry reforming comprises reacting the methane with the carbon dioxide.

17. The method of claim 14, comprising providing heat to the dry reformer vessel for the dry reforming comprising reacting of the methane with the carbon dioxide, wherein the reacting of the methane with the carbon dioxide is endothermic.

* * * * *

UNITED STATES PATENT AND TRADEMARK OFFICE
CERTIFICATE OF CORRECTION

PATENT NO. : 12,258,272 B2
APPLICATION NO. : 17/401071
DATED : March 25, 2025
INVENTOR(S) : Kunho Lee et al.

Page 1 of 1

It is certified that error appears in the above-identified patent and that said Letters Patent is hereby corrected as shown below:

In the Claims

In Column 12, Line 52, Claim 12, please replace "70" with -- 70% --.

Signed and Sealed this
Thirteenth Day of May, 2025

Coke Morgan Stewart
*Acting Director of the United States Patent and Trademark Office*